United States Patent
Daggupati et al.

(10) Patent No.: US 11,879,165 B2
(45) Date of Patent: Jan. 23, 2024

(54) PROCESS FOR RECOVERING VANADIUM IN THE FORM OF IRON VANADATE FROM A GASIFIER SLAG

(71) Applicant: Reliance Industries Limited, Mumbai (IN)

(72) Inventors: Sateesh Daggupati, Khamman (IN); Sachchit Majhi, Jamshedpur (IN); Sukumar Mandal, Faridabad (IN); Asit Kumar Das, Jamnagar (IN); Vishwanath Sapre Ajit, Tampa, FL (US)

(73) Assignee: Reliance Industries Limited, Mumbai (IN)

( * ) Notice: Subject to any disclaimer, the term of this patent is extended or adjusted under 35 U.S.C. 154(b) by 786 days.

(21) Appl. No.: 16/968,275

(22) PCT Filed: Feb. 9, 2019

(86) PCT No.: PCT/IB2019/051059
§ 371 (c)(1),
(2) Date: Aug. 7, 2020

(87) PCT Pub. No.: WO2019/155430
PCT Pub. Date: Aug. 15, 2019

(65) Prior Publication Data
US 2020/0370145 A1 Nov. 26, 2020

(30) Foreign Application Priority Data
Feb. 9, 2018 (IN) .............................. 201821005052

(51) Int. Cl.
| | | |
|---|---|---|
| C22B 1/00 | (2006.01) | |
| C22B 1/02 | (2006.01) | |
| C22B 3/22 | (2006.01) | |
| C22B 7/04 | (2006.01) | |
| C22B 34/22 | (2006.01) | |

(52) U.S. Cl.
CPC .............. C22B 34/22 (2013.01); C22B 1/005 (2013.01); C22B 1/02 (2013.01); C22B 3/22 (2013.01); C22B 7/04 (2013.01)

(58) Field of Classification Search
CPC ........... C22B 34/22; C22B 1/005; C22B 1/02; C22B 3/22; C22B 7/04
See application file for complete search history.

(56) References Cited

U.S. PATENT DOCUMENTS 4,115,110 A    9/1978    Pyrih et al.

FOREIGN PATENT DOCUMENTS

| | | | | |
|---|---|---|---|---|
| CN | 105331822 A | 2/2016 | | |
| JP | 57 063 647 A | * | 4/1982 | ............ Y02P 10/212 |

OTHER PUBLICATIONS

International Search Report issued in International Application No. PCT/IB2019/051059 dated May 23, 2019 (2 pages).
Written Opinion issued in International Application No. PCT/IB2019/051059 dated May 23, 2019 (6 pages).

* cited by examiner

*Primary Examiner* — Timothy C Vanoy
(74) *Attorney, Agent, or Firm* — Osha Bergman Watanabe & Burton LLP

(57) ABSTRACT

The present disclosure relates to a process for recovering vanadium in the form of iron vanadate from a gasifier slag. The process comprises pulverizing the slag to obtain pulverized slag (2). The pulverized slag (2) is soaked in water (6) and an alkali salt (4) to obtain a slurry (8), followed by roasting the slurry in the presence of air to obtain roasted slag (12) which is leached (14) to obtain a first solution (18). The first solution (18) is heated at a temperature in the range of 60° C. to 80° C. while adding an iron salt (17) in an amount in the range of 10 wt % to 60 wt % at a pH in the range of 4 to 10, to obtain a second solid residue (21) which is dried to obtain iron vanadate (24).

15 Claims, 1 Drawing Sheet

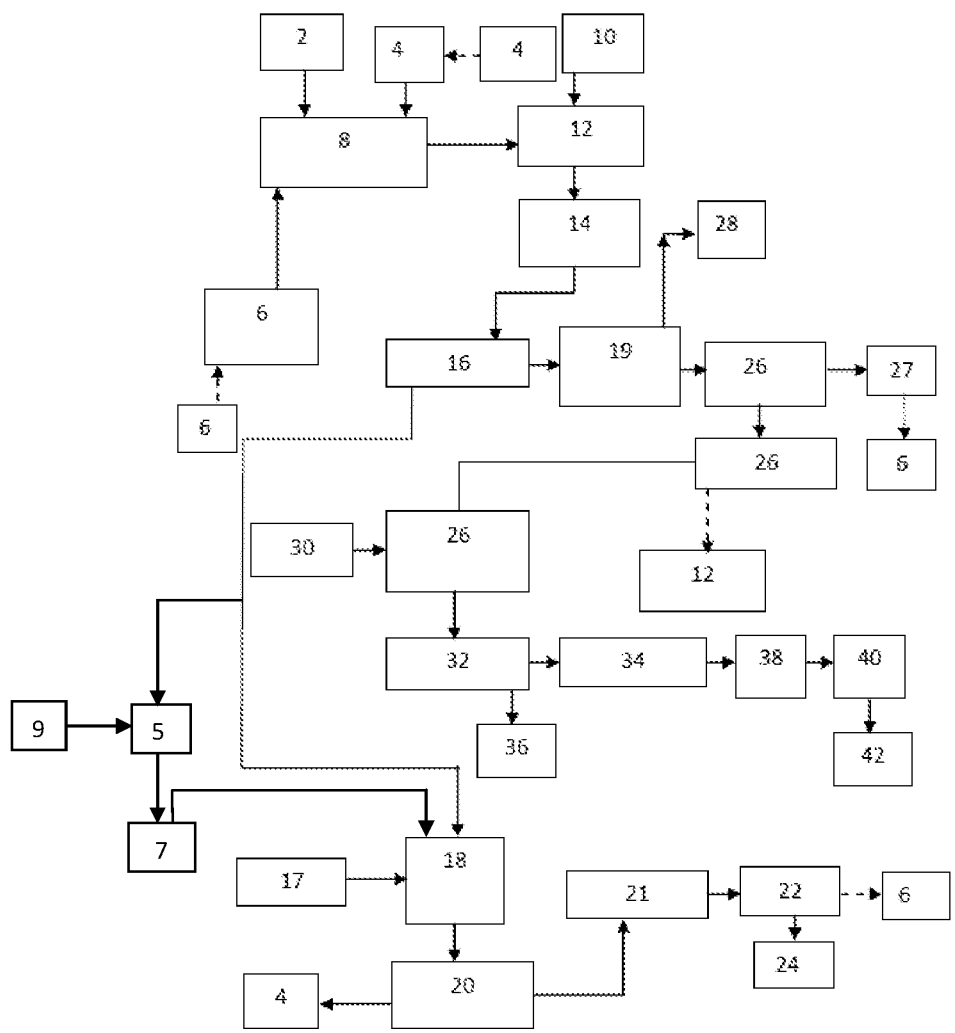

PROCESS FOR RECOVERING VANADIUM IN THE FORM OF IRON VANADATE FROM A GASIFIER SLAG

FIELD

The present disclosure relates to the field of chemical/metallurgy engineering.

Definitions

As used in the present disclosure, the following terms are generally intended to have the meaning as set forth below, except to the extent that the context in which they are used to indicate otherwise.

Vanadium component refers to vanadium or a compound thereof.

Nickel component refers to nickel or a compound thereof.

Aluminium component refers to aluminium or a compound thereof.

Silica component refers to silica or a compound thereof.

Calcium component refers to calcium or a compound thereof.

Sulfur component refers to a compound of sulfur.

BACKGROUND

The background information herein below relates to the present disclosure but is not necessarily prior art.

The gasification process of carbonaceous feedstocks such as petcoke and coal, is conventionally done in gasifiers at temperatures around 1400° C. or higher, that lead to the formation of molten slag as a by-product. The molten slag comprises oxide form of heavy metals having high commercial value, such as 1 wt % to 10 wt % of vanadium, 1 wt % to 3 wt % of nickel and the like. These metals find application in steel industries, batteries and in catalyst compositions used for refining operations. Metals such as vanadium find applicability in producing ferrous and non-ferrous alloys due to its physical properties such as tensile strength, hardness and fatigue resistance. In addition to this, vanadium is used for producing vanadium redox batteries. However, vanadium is not found in its pure state, as it occurs in combination with various other minerals in the form of ores such as carnotite, roscoelite, vanadinite, mottramite, patronite and the like. Hence, the gasifier slag could be an important source of obtaining heavy metals.

Moreover, the safe disposal of the slag is a primary concern, and it is essential to extract the heavy metals from the slag for getting the non-hazardous certification from the respective governing bodies for land filling or safe disposal, for other applications.

There is, therefore, felt a need for a simple and efficient process for recovery of heavy metals from gasifier slag.

OBJECTS

Some of the objects of the present disclosure, which at least one embodiment herein satisfies, are as follows.

It is an object of the present disclosure to ameliorate one or more problems of the prior art or to at least provide a useful alternative.

An object of the present disclosure is to provide a process that extracts heavy metals such as vanadium and Nickel from gasifier slag that is obtained as a by-product of gasification process of carbonaceous feedstocks.

Another object of the present disclosure is to provide a process for recovery of iron and silica components from the gasifier slag.

Other objects and advantages of the present disclosure will be more apparent from the following description, which is not intended to limit the scope of the present disclosure.

SUMMARY

The present disclosure provides a process for recovering vanadium in the form of iron vanadate from a gasifier slag. The process comprises a step of pulverizing gasifier slag to a particle size less than 100 μm to obtain pulverized slag. The pulverized slag is soaked in water and alkali salt to obtain a slurry. The slurry is roasted in the presence of air at a temperature in the range of 750° C. to 1100° C. to obtain roasted slag. The roasted slag is leached in water heated to a temperature below its boiling point to obtain a first biphasic mixture comprising a first solid phase and a first liquid phase. The first biphasic mixture is filtered to obtain a first solid residue and a first solution comprising vanadium compounds.

Typically, prior to the step of roasting, the slurry is dried at a temperature in the range of 100° C. to 140° C. for a time period in the range of 2 hours to 14 hours.

Typically, prior to the step of heating, the first solution is treated with gaseous $CO_2$, for a time duration in the range of 2 hours to 4 hours, to recover alkali salt in the form of carbonates, wherein flow rate of the gaseous $CO_2$ is in the range of 50 mL/min to 250 mL/min.

The first solution is heated to a temperature in the range of 60° C. to 80° C. while adding 10 wt % to 60 wt % of an iron salt at a pH in the range of 4 to 10, to obtain a second biphasic mixture comprising a second solid phase and a second liquid phase. The second biphasic mixture is filtered to obtain a second solid residue comprising iron vanadate and a second solution comprising the alkali salt. The second solid residue is dried at a temperature in the range of 300° C. to 500° C. to obtain iron vanadate.

BRIEF DESCRIPTION OF THE ACCOMPANYING DRAWING

The present disclosure will now be described with the help of the accompanying drawing, in which:

FIG. 1 depicts a flow-path for recovering vanadium component in accordance with the present disclosure.

REFERENCE NUMERALS

| | |
|---|---|
| Pulverized slag | 2 |
| Alkali salt | 4 |
| Water | 6 |
| Slurry | 8 |
| Air | 10 |
| Roasted slag | 12 |
| Leaching | 14 |
| Filtration | 7, 16, 20, 32 |
| Iron salt | 17 |
| Gaseous $CO_2$ | 9 |
| First solution | 18 |
| Vanadium component | 20 |
| Second solid residue | 21 |
| Iron Vanadate | 24 |
| Drying | 22, 27 |
| First solid residue | 19 |
| Treated residue | 26 |

-continued

| | |
|---|---|
| Iron component | 28 |
| Acid | 30 |
| Acid treated liquid | 34 |
| Acid treated residue | 36 |
| Solvent extraction | 38 |
| Stripping process | 40 |
| Nickel component, silica component and alumina component | 42 |

DETAILED DESCRIPTION

Embodiments, of the present disclosure, will now be described with reference to the accompanying drawing.

Embodiments are provided so as to thoroughly and fully convey the scope of the present disclosure to the person skilled in the art. Numerous details are set forth, relating to specific components, and methods, to provide a complete understanding of embodiments of the present disclosure. It will be apparent to the person skilled in the art that the details provided in the embodiments should not be construed to limit the scope of the present disclosure. In some embodiments, well-known processes, well-known apparatus structures, and well-known techniques are not described in detail.

The terminology used, in the present disclosure, is only for the purpose of explaining a particular embodiment and such terminology shall not be considered to limit the scope of the present disclosure. As used in the present disclosure, the forms "a," "an," and "the" may be intended to include the plural forms as well, unless the context clearly suggests otherwise. The terms "comprises," "comprising," "including," and "having," are open ended transitional phrases and therefore specify the presence of stated features, integers, steps, operations, elements, modules, units and/or components, but do not forbid the presence or addition of one or more other features, integers, steps, operations, elements, components, and/or groups thereof. The particular order of steps disclosed in the method and process of the present disclosure is not to be construed as necessarily requiring their performance as described or illustrated. It is also to be understood that additional or alternative steps may be employed.

The terms first, second, third, etc., should not be construed to limit the scope of the present disclosure as the aforementioned terms may be only used to distinguish one element, component, region, layer or section from another component, region, layer or section. Terms such as first, second, third etc., when used herein do not imply a specific sequence or order unless clearly suggested by the present disclosure.

The gasification process produces inorganic non-combustible elements as byproducts, thereby leading to formation of molten slag which is rich in heavy metals having high commercial value. Especially, slag obtained during steel-making process by using titanomagnetite ores, comprises vanadium compounds, and could be used as the direct source for vanadium extraction. Vanadium is an important metal that finds application in producing ferrous and non-ferrous alloys due to its high tensile strength, hardness and fatigue resistance. In addition to this, vanadium is also used for producing vanadium redox batteries.

The extraction of heavy metals from the slag would also ensure efficient utilization of the slag resulting in its safe disposal.

The present disclosure provides a process to recover vanadium from gasifier slag. The present disclosure also envisages a process to recover other metallic and non-metallic components from the gasifier slag.

The process is described with reference to FIG. 1.

A gasifier slag is pulverized to a particle size less than 100 µm to obtain pulverized slag (2). The pulverized slag (2) is soaked in water (6) and an alkali salt (4) to obtain a slurry (8).

Typically, the alkali salt is in an amount in the range of 30 wt % to 150 wt % of the slag. In an embodiment, the alkali salt is taken in an amount of 100 wt % of the slag.

Typically, the alkali salt is at least one selected from the group consisting of sodium carbonate ($Na_2CO_3$), sodium sulfate ($Na_2SO_4$), sodium hydroxide (NaOH) and potassium hydroxide (KOH).

In one embodiment, the alkali salt is sodium carbonate ($Na_2CO_3$). In another embodiment, the alkali salt is sodium hydroxide (NaOH). In yet another embodiment, the alkali salt is a mixture of sodium carbonate ($Na_2CO_3$) and sodium hydroxide (NaOH). In yet another embodiment, the alkali salt is a mixture of sodium carbonate ($Na_2CO_3$) and potassium hydroxide (KOH).

In an embodiment, the water used in the step of soaking is de-ionized water.

In accordance with an embodiment of the present disclosure, the gasifier slag and the alkali salt are pulverized to obtain a homogeneous mixture.

Typically, the slag comprises 1 wt % to 15 wt % of vanadium component; 1 wt % to 10 wt % of iron component; 10 wt % to 40 wt % of aluminium component; 10 wt % to 50 wt % of silica component; 5 wt % to 20 wt % of calcium component; 0.5 wt % to 5 wt % of nickel component; 1 wt % to 5 wt % of magnesium component; and 1 wt % to 5 wt % of sulphur component.

In an embodiment, prior to the step of roasting, the slurry comprising mixture of the slag and the alkali salt is dried at a temperature in the range of 100° C. to 140° C. for a time period in the range of 2 hours to 14 hours.

In an embodiment, the slurry is dried in an oven at 120° C. for 12 hours.

In the next step of the process, the slurry (8) is roasted in the presence of air (10) at a temperature in the range of 750° C. to 1100° C. to obtain roasted slag (12).

Typically, the roasting is done in a rotary calciner in a continuous mode.

The step of roasting ensures the availability of the alkali salt for the reaction with vanadium compound present in the slurry. Preferably, the roasting of the slurry (8) is done at a temperature in the range of 750° C. to 1100° C.

The vanadium metal in the slag, having different oxidation state such as (II), (III), (IV), are oxidized during the roasting step by oxygen at high temperature to form compounds such as sodium metavanadate. The mentioned temperature range is suitable since temperature higher than 1100° C., would lead to evaporation of molten alkali salt, resulting in insufficient vapour pressure for the reaction and also making the walls of the reaction chamber stickier in nature. On the contrary, temperatures lower than 750° C. leads to insufficient temperature for effective roasting of the slag.

In one embodiment, the roasting of the slurry (8) is done at 900° C. In another embodiment, the roasting of the slurry (8) is done at 800° C.

Typically, the step of roasting is carried out for a time period in the range of 30 minutes to 380 minutes. In an embodiment, the roasting is carried out for 360 minutes.

In the next step of the process, the roasted slag (12) is leached (14) in water at a temperature below its boiling point to obtain a first biphasic mixture comprising a first solid phase and a first liquid phase.

The step of leaching is carried out for a time period in the range of 30 minutes to 380 minutes. In an embodiment, the leaching is carried out for 60 minutes.

Typically, the step of leaching is done at a temperature in the range of 65° C. to 95° C. In an embodiment, the leaching is done at 90° C.

In an embodiment, the water in the present step is de-ionized water.

The ratio of the water to the roasted slag in the present step is in the range of 1:1 to 5:1. In an embodiment, the ratio of the water to the roasted slag is 3:1.

Typically, the leaching temperature being lower than the boiling point of water avoids evaporation of water and provides an optimum temperature for the extraction of the water soluble sodium metavanadate, formed during the roasting step, into the first liquid phase during leaching. Typically, the first solution comprises vanadium salts including, but not limited to, sodium meta-vanadate. In an embodiment, the first solution comprises vanadium salts and unreacted alkali metal of the alkali salt.

The first biphasic mixture is filtered to obtain a first solid residue (19) and a first solution (18) comprising vanadium compounds.

Typically, the first solution comprises vanadium compounds in the range of 60 wt. % to 95 wt. %, which is extracted during the leaching step.

Typically, the first solution has original pH in the range of 9 to 12.95. In an embodiment, the pH of the first solution is 9.5. In another embodiment, the pH of the first solution is 12.9.

Further, in the next step, the first solution (18) is heated to a temperature in the range of 60° C. to 80° C., while adding therein an iron salt in an amount in the range of 10 wt % to 60 wt %, at a pH in the range of 4 to 10, to obtain a second biphasic mixture comprising a second solid phase and a second liquid phase. The second biphasic mixture is filtered (20) to obtain a second solid residue comprising iron vanadate and a second solution comprising the alkali salt (4).

Typically, the step of heating is carried out for a time period in the range of 30 minutes to 380 minutes.

In an embodiment, the iron salt is iron sulfate.

In one embodiment, the first solution (18) is heated to 60° C. for 50 minutes. In another embodiment, the first solution (18) is heated to 70° C. for 60 minutes.

Typically the pH of the first solution during the step of heating is maintained in the range of 4 to 10 by addition of at least one compound selected from dilute mineral acid and ammonia. In one embodiment, the mineral acid is nitric acid. In another embodiment, the mineral acid is hydrochloric acid.

In an embodiment, the step of roasting the slurry is done at 900° C. and the pH during the step of heating is maintained at 4.5.

In an embodiment, the second solution, comprising the alkali salt (4), is recycled to the step of obtaining the slurry (8), thereby reducing the amount of raw materials (the alkali salt and water) required for obtaining the slurry (8).

In one embodiment, prior to the step of heating, at least a portion (5) of the first solution is treated with gaseous $CO_2$ (9), for a time duration in the range of 2 hours to 4 hours, to recover alkali metal of the alkali salt in the form of carbonates. The treatment with the gaseous $CO_2$ leads to the removal of excess amount of alkali metal such as sodium.

Typically, the carbonates are removed by filtration (7) and the first solution is treated with the iron salt (17), as mentioned above, to obtain iron vanadate (24).

Typically, the flow rate of the gaseous $CO_2$ is in the range of 50 mL/min to 200 ml/min. In an embodiment, the flow rate of the gaseous $CO_2$ is 100 mL/min for 5 litres of the first solution.

In the next step, the second solid residue is dried (22) at a temperature in the range of 300° C. to 500° C. to obtain iron vanadate (24). The step of drying ensures the removal of water content from the second solid residue.

In an embodiment, the second solid residue is dried at 450° C.

The yield of the iron vanadate obtained from the process of the present disclosure is at least 50%, and the purity of the iron vanadate obtained by the process of the present disclosure is at least 87%.

In an embodiment, the yield of the iron vanadate is 84% and the purity is 95%. In another embodiment, the yield of the iron vanadate is 92% and the purity is 98%.

Further, the first solid residue (19) is subjected to magnetic separation to obtain an iron component (28) and a treated residue (26).

Typically, the treated residue (26) is dried (27) to evaporate the water therefrom.

In an embodiment, at least a first portion of the treated residue (26) is recycled to the step of roasting of the slurry (8).

In the instant embodiment, at least a second portion of the treated residue (26) is mixed with an acid (30) to obtain a third biphasic mixture comprising a third solid phase and a third liquid phase. The third solid phase comprises an acid treated residue (36) and the third liquid phase comprises an acid treated liquid (34). The third biphasic mixture is filtered (32) to obtain the acid treated residue (36) and the acid treated liquid (34).

Typically, the acid is a concentrated acid selected from sulfuric acid and nitric acid.

In an embodiment, the acid treated residue (36) is calcined. Typically, the exhaust gases such as $NO_2$, $CO_2$ and $SO_2$ are generated during this step of calcination.

The acid treated liquid (34) comprises at least one solubilized component (42) selected from the group consisting of nickel component, aluminium component and silica component.

In one embodiment, the acid treated liquid (34) is subjected to a solvent extraction process (38) wherein the acid treated liquid (34) is treated with a solvent to recover at least one component (42) selected from the group consisting of nickel component, cobalt component, aluminium component and silica component.

In another embodiment, the acid treated liquid (34) is subjected to a solvent extraction process (38) wherein the acid treated liquid (34) is treated with a stripping agent to recover at least one component (42) selected from the group consisting of nickel component, cobalt component, aluminium component and silica component.

Typically, the solvent is at least one selected from the group consisting of hydroxyl oximes, hydroxyl quinoline, tertiary amine, dialkyl phosphinic acid and neodecanoic acid.

In an embodiment, the nickel component is recovered by using at least one solvent selected from the group consisting of hydroxyl oximes, hydroxyl quinoline, and tertiary amines. Typically the pH in the range of 6 to 7 and the temperature is in the range of 55° C. to 65° C. In an embodiment, the temperature is 60° C.

Typically, the stripping agent is a mineral acid selected from the group consisting of sulphuric acid ($H_2SO_4$) and nitric acid ($HNO_3$).

In an embodiment, 10% $H_2SO_4$ is used as a stripping agent at a temperature in the range of 40° C. to 80° C. for a time duration of 55 minutes to 65 minutes.

In an embodiment, the ratio of acid treated liquid to the stripping agent is 1:3.

The process of the present disclosure ensures recycling of the water evaporated from the steps of drying (22, 27) mentioned herein above to the process step of obtaining the slurry.

The process of the present disclosure is economical because all the intermediate streams such as evaporated water, the first solid residue (19) and the second solution comprising the alkali salt, are recycled to reduce the amount of raw materials required in the entire process.

In an embodiment, the process of the present disclosure also facilitates in recovering calcium component, magnesium component and sulphur component from the slag deposited in the gasifier.

The foregoing description of the embodiments has been provided for purposes of illustration and not intended to limit the scope of the present disclosure. Individual components of a particular embodiment are generally not limited to that particular embodiment, but, are interchangeable. Such variations are not to be regarded as a departure from the present disclosure, and all such modifications are considered to be within the scope of the present disclosure.

The present disclosure is further described in light of the following laboratory scale experiments which are set forth for illustration purpose only and not to be construed for limiting the scope of the disclosure. These laboratory scale experiments can be scaled up to industrial/commercial scale and the results obtained can be extrapolated to industrial/commercial scale.

Experiment 1:

A gasification slag (petcoke fired gasifier slag) was pulverized to a size less than 75 microns to obtain pulverized slag. The composition of the slag used is depicted in Table 1. 100 g of the pulverized slag was soaked in water (30 g) and 30 g of $Na_2CO_3$ for 1 hour to obtain a slurry. The slurry was dried at 120° C. for 12 hours and then roasted in the presence of air at 900° C. for 360 minutes to obtain roasted slag. The roasted slag was leached in de-ionized water at 90° C. for 60 minutes to obtain a first biphasic mixture. In the present step of leaching, the ratio of the water to the roasted slag was 3:1 mL/g. The first biphasic mixture was separated to obtain a first solid residue and a first solution having pH of 10.7, that comprised 80 wt % of vanadium compounds in the form of vanadium salts. The first solution was heated to 60° C. while adding under stirring, 37 g of iron sulfate in the first solution which was maintained at pH 8 by addition of either dilute mineral acid or ammonia. The mixture so obtained was stirred for 50 minutes to obtain a second biphasic mixture which was filtered to obtain a second solid residue comprising iron vanadate and a second solution. The second solid residue was dried at 450° C. to obtain 80% yield of iron vanadate ($FeOV_2O_5$) (i.e. 80% feed vanadium was converted to iron vanadate) having a purity of 95%.

The amount of vanadium compounds in the first solution and the quantification of individual metal components in the slag were measured using Inductively Coupled Plasma (ICP) analysis.

TABLE 1

Composition of slag used in Experiments 1-11

| Element | V | Ni | Ti | Fe | Na | Mg | Ca | Cr | Co | C | S | Al | Si |
|---|---|---|---|---|---|---|---|---|---|---|---|---|---|
| wt. % | 4.2 | 0.4 | 0.6 | 3.5 | 1.1 | 2.4 | 11.1 | 0.1 | 0.01 | 5 | 5.7 | 6.6 | 16.8 |

Experiments 2-9:

Experiments 2-9 were carried out in accordance with the procedure as described in Experiment 1, except that the amount of alkali ($Na_2CO_3$) added, roasting temperature, parameters of leaching, and the amount of iron sulfate added were varied, as summarized below in Table 2.

The columns in Table 2 provide the details of the Experiment number, amount of slag taken, the amount of alkali ($Na_2CO_3$) added during soaking, the amount of water added during soaking, temperature/time during roasting, temperature/time during leaching, pH of first solution i.e. initial pH obtained after leaching and final pH maintained during formation of iron vanadate, amount of vanadium compounds present in first solution (obtained after leaching), amount of iron sulfate added to the first solution for formation of iron vanadate, yield of iron vanadate obtained after calcination and purity of iron vanadate.

TABLE 2

Reaction parameters and the results obtained in Experiments 1-9

| Exp. No. | Amt of slag (in g) | Amt of alkali salt ($Na_2CO_3$) (in g) | Amt of water added (in g) | Roasting temp (in ° C.) (time: 360 mins) | Leaching temp (in ° C.) (time: 60 mins) | pH of first solution Initial | pH of first solution Final | Amt of vanadium compds in first solution (in wt. %) | Amt of iron sulfate (in g) | Yield (in %) of iron vanadate | Purity of iron vanadate (in %) |
|---|---|---|---|---|---|---|---|---|---|---|---|
| 1 | 100 | 30 | 30 | 900 | 90 | 10.7 | 8 | 80 | 37 | 80 | 95 |
| 2 | 100 | 30 | 30 | 900 | 90 | 11.9 | 6.3 | 78 | 24 | 78 | 91 |
| 3 | 100 | 15 | 15 | 900 | 90 | 9.5 | 5.6 | 70 | 40 | 70 | 96 |
| 4 | 100 | 45 | 45 | 900 | 90 | 12.9 | 7.2 | 90 | 40 | 88 | 89 |
| 5 | 100 | 30 | 30 | 800 | 90 | 12.1 | 6 | 75 | 40 | 72 | 94 |
| 6 | 100 | 30 | 30 | 1000 | 90 | 12.6 | 5.5 | 85 | 40 | 84 | 95 |
| 7 | 100 | 30 | 30 | 900 | 90 | 12.4 | 6 | 90 | 40 | 86 | 95 |
| 8 | 100 | 30 | 30 | 900 | 90 | 11.8 | 4.5 | 93 | 56 | 92 | 98 |
| 9 | 100 | 30 | 0 | 900 | 90 | 12.9 | 8 | 70 | 37 | 65 | 95 |

It is observed that using lower amount of alkali (as in Exp. No. 3) leads to extraction of lower amount of vanadium compounds into the first solution, however, the product iron vanadate obtained has high purity (96%). Further, higher amount of alkali added (as in Exp. No. 4) leads to improved extraction of vanadium compounds into the first solution. It means that at high salt concentration, the availability of Na is higher for the reaction with vanadium present is the slag.

Furthermore, higher roasting temperature (as in Exp. No. 6) is favorable for better extraction of vanadium compounds (90 wt %). However, roasting temperature around 1000° C. also leads to stickiness in the reaction vessel. Hence an optimum temperature in the range of 850° C. to 950° C. is preferred.

Furthermore, lower pH during the addition of iron sulfate and higher amount of iron sulfate showed an improvement in yield and purity of the product iron vanadate (as in Exp. No. 8). Furthermore, employing the alkali salt in solid form with no water (as in Exp. No. 9) leads to poor extraction of vanadium compounds. This could be due to the non-homogeneity of salt slag mixture.

Experiment 10:

100 g of the first solid residue from experiment 6 was leached in 300 g of 10% concentrated $H_2SO_4$ at 60° C. for 60 minutes which resulted in a third biphasic mixture which was filtered to obtain an acid treated residue and an acid treated liquid comprising 80 wt. % of nickel component in the form of nickel salts The pH of the acid treated liquid was observed to be 3.5. The concentration of nickel in the acid treated liquid was analyzed with the Inductively coupled plasma (ICP) analysis which indicates that 80 wt. % of nickel content of first solid residue was leached by the sulfuric acid.

This acid treated liquid also had Ca, Al, Si, Fe, and Mg components, as $H_2SO_4$ was capable to leach these metals. The purity of nickel component was improved by doing solvent extraction with a solvent (20% hydroxyl-oximes) at pH 6 and temperature 60° C.

Experiment 11:

100 g of the first solid residue of experiment 4 was leached in 300 g of 10% concentrated $HNO_3$ was used at 60° C. for 60 minutes that resulted in a third biphasic mixture which was filtered to obtain an acid treated residue and an acid treated liquid comprising 90 wt. % of nickel component in the form of nickel salts. The pH of the acid treated liquid was 2.96. The concentration of nickel in the acid treated liquid was analyzed with the ICP analysis which indicates that 90 wt % of nickel in the first solid residue was leached by nitric acid. The acid treated liquid also had Ca, Al, Si, Fe and Mg components.

The purity of nickel in the acid treated liquid, was improved by solvent extraction with 20% hydroxyl quinoline at pH 6.5 and 50° C. to obtain pure nickel.

Experiment 12:

3 kg of slag was thoroughly mixed with 1.5 kg of sodium hydroxide and 1.5 kg of sodium carbonate taken in 1.5 kg of water. The composition of the slag used is depicted in Table 3. The mixing process was adopted by soaking of slag in the salt mixture for a period of 1 hour to obtain a slurry. The slurry was subjected to drying in an oven at 120° C. for 12 hours followed by roasting in a rotary calciner at 950° C. for 3 hours in presence of excess air to obtain a roasted slag. The roasted slag was leached in de-ionized water at 90° C. for 1 hour wherein the ratio of water to the roasted slag was 3:1 to obtain a first biphasic mixture. The first biphasic mixture was filtered to obtain a first solid residue and a first solution having a pH of 9.8 and comprising vanadium compounds. The first solution was heated to 60° C., while adding under stirring, 300 g of iron sulfate in the first solution which was maintained at pH 6.3 by addition of either dilute mineral acid or ammonia. The mixture so obtained was stirred for 50 minutes to obtain a second biphasic mixture which is filtered to obtain a second solid residue comprising iron vanadate and a second solution. In the present step, the pH of the separated first solution was maintained at 6.3. The second solid residue was dried at 450° C. to obtain 75.4% yield of iron vanadate ($FeOV_2O_5$) (i.e. 75.4% feed vanadium was converted to iron vanadate) having 95% purity.

TABLE 3

Composition of slag used in Experiments 12-19

| Element | V | Ni | Ni | Ti | Fe | Na | Mg | Ca | Cr |
|---|---|---|---|---|---|---|---|---|---|
| wt. % | 4.1 | 0.41 | 0.4 | 0.53 | 5.12 | 0.9 | 1.65 | 14.64 | 0.12 |
| Element | Al | Si | Mo | Zn | P | Ba | Mn | Na | K |
| wt. % | 6.25 | 25.05 | 0.08 | 0.02 | 0.25 | 0.22 | 0.05 | 0.9 | 1.4 |

Experiments 13-19:

Experiments 13-19 were carried out in accordance with the procedure as described in Experiment 12, except that the amount of alkali added, parameters of roasting, pH during addition of iron sulfate and the amount of iron sulfate added were varied, as summarized below in Table 4.

The experiments 16-19 comprise an additional step of recovering the excess alkali metal of the alkali salt. This step comprises bubbling gaseous carbon-dioxide ($CO_2$) in the first solution at a flow rate of 60 mL/min for 2 hours under stirring condition, prior to the step of heating, to precipitate sodium carbonate which was removed by filtration. The precipitate was dried at 100° C. for 2 hours to recover $Na_2CO_3$. The amount of recovered $Na_2CO_3$ is summarized in Table 4.

The columns in Table 4 provide the details of the Experiment number, amount of slag taken, the amount of alkali salt added during soaking, the amount of water added during soaking, temperature/time during roasting, pH of first solution (obtained after leaching), amount of vanadium compounds present in first solution (after leaching), amount of iron sulfate added to the first solution for formation of iron vanadate, yield of iron vanadate obtained after calcination (percentage of feed vanadium converted to iron vanadate) and purity of iron vanadate. Table 4: Reaction parameters and the results obtained in Experiments 12-19

| Exp. No. | Amt of slag (in kg) | Amt of alkali salt added | | Amt of $H_2O$ (in kg) | Roasting temp/time | | Amt of $Na_2CO_3$ recovered (in g) | pH of first solution | | Amt of vanadium compds in first solution (in wt. %) | Amt of iron sulfate added (in g) | Yield of iron vanadate (in %) | Purity of iron vanadate (in %) |
|---|---|---|---|---|---|---|---|---|---|---|---|---|---|
| | | $Na_2CO_3$ (in kg) | NaOH (in kg) | | Temp (in ° C.) | Time (in mins) | | Initial | Final | | | | |
| 12 | 3.0 | 1.5 | 1.5 | 3.0 | 950 | 180 | — | 9.8 | 6.3 | 75.4 | 300 | 75.4 | 95 |
| 13 | 3.0 | — | 3.0 | 3.0 | 950 | 180 | — | 11.4 | 6.3 | 74.3 | 300 | 74.3 | 95 |
| 14 | 3.0 | 3.0 | — | 3.0 | 950 | 180 | — | 11.3 | 6.3 | 61.3 | 300 | 61.3 | 95 |

-continued

| Exp. No. | Amt of slag (in kg) | Amt of alkali salt added | | Amt of H₂O (in kg) | Roasting temp/time | | Amt of Na₂CO₃ recovered (in g) | pH of first solution | | Amt of vanadium compds in first solution (in wt. %) | Amt of iron sulfate added (in g) | Yield of iron vanadate (in %) | Purity of iron vanadate (in %) |
|---|---|---|---|---|---|---|---|---|---|---|---|---|---|
| | | Na₂CO₃ (in kg) | NaOH (in kg) | | Temp (in °C.) | Time (in mins) | | Initial | Final | | | | |
| 15 | 3.0 | 4.5 | — | 4.5 | 950 | 180 | — | 11.3 | 6.3 | 77.78 | 300 | 77.78 | 95 |
| 16 | 1.5 | 0.75 | 0.75 | 1.5 | 950 | 60 | 250 g | 11.6 | 9 | 77.78 | 250 | 77 | 95 |
| 17 | 1.5 | 0.75 | 0.75 | 1.5 | 950 | 120 | 510 g | 11.2 | 9 | 70.56 | 250 | 69 | 95 |
| 18 | 2.0 | 1.0 | 1.0 | 2.0 | 950 | 360 | 560 g | 11 | 9 | 79 | 320 | 77 | 96 |
| 19 | 1.0 | 0.5 | 0.5 | 1.0 | 1000 | 60 | 201 g | 11.8 | 9 | 71 | 160 | 70 | 94 |

It is observed that using higher amount of alkali, especially NaOH (as in Exp. No. 15) leads to more vanadium compounds to be extracted into the first solution (77.78 wt %). Further, roasting for a longer time (Exp. No. 18) also lead to more vanadium compounds in the first solution.

However, lower amount of alkali and roasting temperature around 1000° C., lead to lower amount of vanadium compounds in the first solution (as in Exp. No. 19).

Further, it was observed that slag used in Experiments 12-19, comprises relatively higher amount of silica in comparison to the slag used in Experiments 1-9. The high amount of silica leads to complex glassy structure of the slag. However, using the process of the present disclosure, vanadium was recovered effectively with higher yield and purity, even from a slag with high silica content, in comparison to the conventional processes.

The present disclosure provides a simple and efficient process for recovering vanadium in the form of iron vanadate from a gasifier slag along with the recovery of other important metallic and non-metallic components. The process also leads to a slag which is safer to dispose due to recovery of heavy metals.

Technical Advancements

The present disclosure described herein above has several technical advantages including, but not limited to, the realization of a process:

that recovers a vanadium component of purity greater than 87% from the gasifier slag which is a byproduct of gasification;

that recovers other valuable components such as iron, silica, alumina and nickel from the slag deposited in the gasifier; and in which all the intermediate streams such as evaporated water, solid residue and the final filtered solution comprising the alkali salt generated are collected and recycled in the same process so as to reduce the amount of raw materials required in the entire process, thereby making the process economical.

The disclosure has been described with reference to the accompanying embodiments which do not limit the scope and ambit of the disclosure. The description provided is purely by way of example and illustration.

The embodiments herein and the various features and advantageous details thereof are explained with reference to the non-limiting embodiments in the following description. Descriptions of well-known components and processing techniques are omitted so as to not unnecessarily obscure the embodiments herein.

The foregoing description of the specific embodiments so fully revealed the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The invention claimed is:

1. A process for recovering vanadium in the form of iron vanadate from a gasifier slag, said process comprising the following steps:
    a) pulverizing gasifier slag to a particle size less than 100 μm to obtain pulverized slag;
    b) soaking said pulverized slag in water and alkali salt to obtain a slurry;
    c) roasting said slurry in the presence of air at a temperature in the range of 750° C. to 1100° C. to obtain roasted slag;
    d) leaching said roasted slag in water heated to a temperature below its boiling point to obtain a first biphasic mixture comprising a first solid phase and a first liquid phase;
    e) filtering said first biphasic mixture to obtain a first solid residue and a first solution comprising vanadium compounds;
    f) heating said first solution to a temperature in the range of 60° C. to 80° C. while adding therein, an iron salt in an amount in the range of 10 wt % to 60 wt % at a pH in the range of 4 to 10, to obtain a second biphasic mixture comprising a second solid phase and a second liquid phase;
    g) filtering said second biphasic mixture to obtain a second solid residue comprising iron vanadate and a second solution comprising said alkali salt; and
    h) drying said second solid residue at a temperature in the range of 300° C. to 500° C. to obtain iron vanadate.

2. The process as claimed in claim 1, wherein:
    said alkali salt is in an amount in the range of 30 wt % to 150 wt % of the slag, wherein said alkali salt is at least one selected from the group consisting of sodium carbonate (Na2CO3), sodium sulfate (Na2SO4), sodium hydroxide (NaOH) and potassium hydroxide (KOH); and
    said iron salt is iron sulfate.

3. The process as claimed in claim 1, wherein prior to the step (c) of roasting, the slurry is dried at a temperature in the range of 100° C. to 140° C. for a time period in the range of 2 hours to 14 hours.

4. The process as claimed in claim 1, wherein prior to the step (f) of heating, said first solution is treated with gaseous $CO_2$, for a time duration in the range of 2 hours to 4 hours, to recover alkali salt in the form of carbonates, wherein flow rate of the gaseous $CO_2$ is in the range of 50 mL/min to 250 mL/min.

5. The process as claimed in claim 1, wherein said second solution obtained in the step (g) is recycled to the step (b) of soaking.

6. The process as claimed in claim 1 comprising:
   i. subjecting said first solid residue obtained in the step (e), to magnetic separation to obtain an iron component and a treated residue; and
   ii. recycling at least a first portion of said treated residue to the step (c) of roasting.

7. The process as claimed in claim 6 comprising:
   i. mixing at least a second portion of said treated residue with an acid to obtain a third biphasic mixture comprising a third solid phase and a third liquid phase; and
   ii. filtering said third biphasic mixture to obtain acid treated residue and acid treated liquid, wherein said acid treated liquid comprises at least one component selected from the group consisting of nickel component, silica component and aluminum component.

8. The process as claimed in claim 7, wherein said acid treated liquid is treated with at least one solvent selected from the group consisting of hydroxyl oximes, hydroxyl quinoline, tertiary amine, dialkyl phosphinic acid and neodecanoic acid, to recover at least one component selected from the group consisting of nickel component, silica component and aluminum component, wherein said acid treated residue is calcined.

9. The process as claimed in claim 7, wherein said acid treated liquid is treated with at least one stripping agent selected from the group consisting of sulphuric acid and nitric acid.

10. The process as claimed in claim 1, wherein the process steps (c), (d) and (f) of roasting, leaching and heating respectively, are independently carried out for a time period in the range of 30 minutes to 380 minutes.

11. The process as claimed in claim 1, wherein the yield of the iron vanadate obtained in the step (h) is at least 50%, and the purity of the iron vanadate obtained in the step (h) is at least 87%.

12. The process as claimed in claim 1, wherein the water used in the step (b) and the step (d) is de-ionized water.

13. The process as claimed in claim 1, wherein the ratio of the water to said roasted slag in the step (d) of leaching is in the range of 1:1 to 5:1.

14. The process as claimed in claim 1, wherein the pH of the first solution during the step (f) of heating is maintained in the range of 4 to 10 by addition of at least one compound selected from mineral acid and ammonia.

15. The process as claimed in claim 1, wherein the step (c) of roasting said slurry is done at 900° C. and the pH during the step (f) of heating is maintained at 4.5.

* * * * *